United States Patent
Chen et al.

(10) Patent No.: US 8,030,407 B2
(45) Date of Patent: Oct. 4, 2011

(54) ACTIVATED CARBON FIBERS AND PRECURSOR MATERIAL THEREOF

(75) Inventors: Lien Tai Chen, Taoyuan County (TW); Shu-Hui Cheng, Hsinchu County (TW); Tun-Fun Way, Hsinchu (TW); Tzu Hsien Han, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 171 days.

(21) Appl. No.: 11/892,639

(22) Filed: Aug. 24, 2007

(65) Prior Publication Data

US 2008/0287607 A1    Nov. 20, 2008

(30) Foreign Application Priority Data

May 16, 2007    (TW) .............................. 96117356 A

(51) Int. Cl.
*C08L 39/04*    (2006.01)
(52) U.S. Cl. ......... 525/204; 525/203; 525/233; 525/234
(58) Field of Classification Search ............... 525/204, 525/203, 233, 234
See application file for complete search history.

(56) References Cited

U.S. PATENT DOCUMENTS

| | | | | | |
|---|---|---|---|---|---|
| 2,537,031 | A | * | 1/1951 | Chaney ........................... | 526/80 |
| 2,740,687 | A | * | 4/1956 | Ham ................................ | 8/511 |
| 2,891,025 | A | * | 6/1959 | Price .............................. | 524/420 |
| 2,918,447 | A | * | 12/1959 | Ham ............................... | 524/235 |
| 4,505,797 | A | * | 3/1985 | Hodgdon et al. ............. | 204/252 |
| 5,532,099 | A | * | 7/1996 | Horie et al. ................... | 430/115 |
| 2005/0011827 | A1 | * | 1/2005 | Koslow ......................... | 210/503 |

FOREIGN PATENT DOCUMENTS

| TW | 472090 | 5/1989 |
|---|---|---|
| TW | 508380 | 6/2001 |

\* cited by examiner

*Primary Examiner* — Vasu Jagannathan
*Assistant Examiner* — Mark Kaucher
(74) *Attorney, Agent, or Firm* — Birch, Stewart, Kolasch & Birch, LLP

(57) ABSTRACT

An activated carbon fiber for fabricating a supercapacitor electrode and its precursor material are provided. The precursor material of the activated carbon fiber includes polyacrylonitrile (PAN) and a polymer having formula (I):

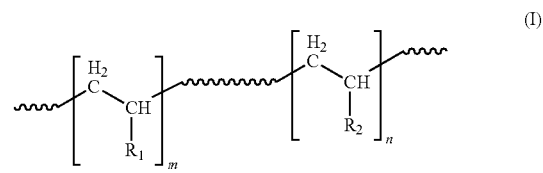

wherein $R_1$ is cyano, phenyl, acetate, or methoxycarbonyl, $R_2$ is

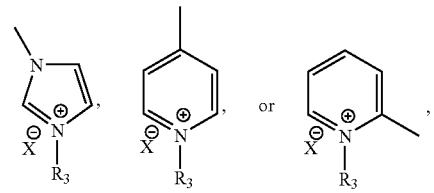

$R_3$ is $C_{1-7}$ alkyl, X is chlorine, bromine, tetrafluoroborate ($BF_4$), hexafluorophosphate (PF6), or $NH(SO_2CH_3)_2$, and m/n is 1-99/99-1.

1 Claim, 4 Drawing Sheets

ACTIVATED CARBON FIBERS AND PRECURSOR MATERIAL THEREOF

BACKGROUND OF THE INVENTION

1. Field of the Invention

The invention relates to a carbon fiber, and more specifically to an activated carbon fiber for fabricating a supercapacitor electrode and its precursor material.

2. Description of the Related Art

Among precursor materials for carbon fibers, polyacrylonitrile (PAN) has a great potential due to its high molecular orientation, high melting point, and high carbon yield (exceeding 45%). After a pre-heating treatment, a high-order ladder-typed oxidized PAN fiber structure is formed, with high thermal stability. During activation, the main molecular chain of PAN remains unchanged, without cleavage, such that an activated carbon fiber with excellent quality is prepared.

Currently, a lithium secondary battery is the main power energy source due to its high energy density. Carbon is the key material for the negative electrode thereof, for example, mesocarbon microbeads (MCMB) or graphite fibers (or powders). However, the lithium secondary battery cannot provide a high-power output because of its electrode structure, limiting the applications for power tools and electric vehicles (EV). High-power output can be achieved with a combination of supercapacitor and battery. Generally, activated carbon materials with a high surface area, a high porosity, and a high electric conductivity can be utilized as the electrode material of the supercapacitor. Further, such properties can be improved by formation of nano carbon materials. However, when nano carbon material is utilized to prepare an electrode, a great quantity of binder is required, resulting in low energy density. Finer carbon fibers can solve the above problem.

BRIEF SUMMARY OF THE INVENTION

One embodiment of the invention provides a precursor material of an activated carbon fiber comprising polyacrylonitrile (PAN) and a polymer having formula (I):

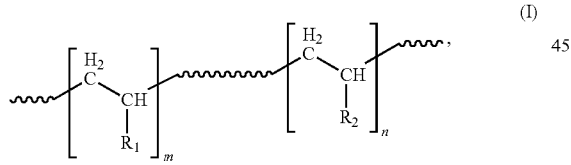

wherein $R_1$ is cyano, phenyl, acetate, or methoxycarbonyl, $R_2$ is

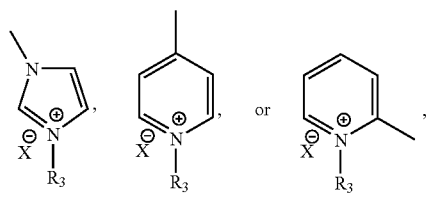

$R_3$ is $C_{1-7}$ alkyl, X is chlorine, bromine, tetrafluoroborate ($BF_4$), hexafluorophosphate ($PF_6$), or $NH(SO_2CH_3)_2$, and m/n is 1-99/99-1. The PAN comprises PAN homopolymer or PAN copolymer.

One embodiment of the invention provides an activated carbon fiber for a supercapacitor electrode, prepared by the following steps, comprising providing a solution comprising the disclosed precursor materials, spinning the solution into fibers, stabilizing first then heat treatment of the fibers to form an activated carbon fiber.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawing, wherein.

DETAILED DESCRIPTION OF THE INVENTION

Figure 1:
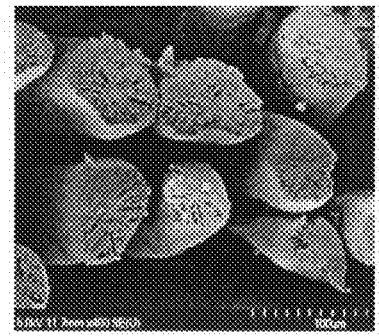
FIGS. 1-3 are cross-sectional views of wet-spun fibers from spinning solution of the invention.

The following description is of the best-contemplated mode of carrying out the invention. This description is made for the purpose of illustrating the general principles of the invention and should not be taken in a limiting sense. The scope of the invention is best determined by reference to the appended claims.

One embodiment of the invention provides a precursor material of an activated carbon fiber comprising polyacrylonitrile (PAN) and a polymer having formula (I):

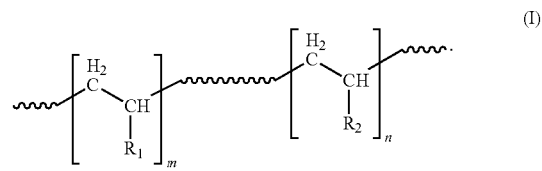

In formula (I), $R_1$ may comprise cyano, phenyl, acetate, or methoxycarbonyl. $R_2$ may comprise

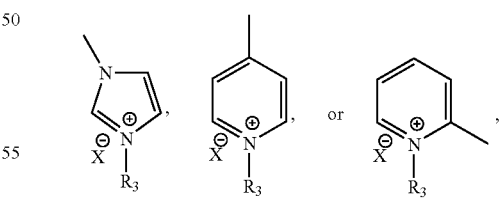

and $R_3$ may be $C_{1-7}$ alkyl and X may be chlorine, bromine, tetrafluoroborate ($BF_4$), hexafluorophosphate ($PF_6$), or $NH(SO_2CH_3)_2$ and m/n is 1-99/99-1.

In the activated carbon fiber precursor material, the polymer has a weight ratio less than 30%. The PAN has a molecular weight of about 50,000-400,000 g/mole. The PAN may comprise PAN homopolymer or PAN copolymer.

The preparation of the polymer having formula (I) is as follows. An ethylene monomer with a functional group such as cyano, phenyl, acetate, or methoxycarbonyl, another ethylene monomer with a functional group such as

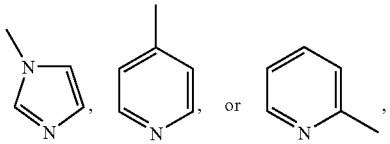

and an initiator such as 2,2'-azobisisobutyronitrile (AIBN) were mixed and polymerized to form a copolymer. Next, the copolymer was dissolved in a solvent such as dimethylacetamide (DMAc) to form an ionic copolymer. The ionic copolymer was then ion-exchanged to prepare the polymer having formula (I).

One embodiment of the invention provides an activated carbon fiber, prepared as follows. A spinning solution comprising the disclosed activated carbon fiber precursor material is provided. Next, the spinning solution is spun into fibers. After the fibers are thermally stabilized, a heat treatment is performed to form activated carbon fibers.

The spinning solution may comprise a solvent such as dimethylforamide or dimethylacetamide (DMAc). The spinning solution has a solid content of about 5-30%.

The spinning process includes nano spinning or wet spinning process. The nano spinning process further includes electrospinning or solution blowing process. The wet spinning process may comprise a first coagulating bath and a second coagulating bath. The first coagulating bath may contain solution of about 5-95 wt % solvent such as dimethylacetamide and water. The second coagulating bath may contain water.

The fiber is thermally stabilized at about 200-300° C., preferable 220-270° C.

The following heat treatment is a carbon activation process, for example, comprising a carbonization and a subsequent activation or simultaneous carbonization and activation. The heat treatment has a heating temperature of about 600-1,500° C., preferable 800-1,100° C.

The disclosed activated carbon fiber has a specific surface area of about 200-3,000 $m^2/g$, and a specific resistance less than 10 $\Omega m$, for example, 10-0.01 $\Omega m$, and the capacitance in an aqueous electrolyte capacitor system exceeding 250 F/g, for example, 250-1,500 F/g, and the capacitance in an non-aqueous (organic) electrolyte capacitor system exceeding 30 F/g, for example, 30-130 F/g.

In an embodiment, the disclosed copolymer containing nitrogen-derived cationic group, or boro- or phosphous-derived anionic groups is added to the spinning solution. Nano size phase separation may occur during the fiber formation. After carbon activation process, meso and macro pores inside the carbon fibers are formed. The disclosed activated carbon fiber has an effective surface area exceeding 2,000 $m^2/g$ (BET test method). When applied in a supercapacitor, the activated carbon fiber provides a capacitance in an aqueous electrolyte capacitor system exceeding 300 F/g and a capacitance in a non-aqueous (organic) aqueous electrolyte capacitor system exceeding 30 F/g. Graphitization and surface treatment may improve properties of the carbon fiber to expand more applications for energy storage use.

EXAMPLES

Example 1

Preparation of poly(styrene-ethylenylbutyl imidazole)hexafluoro phosphate (1) Synthesis of poly(styrene-1-ethylenyl imidazole)

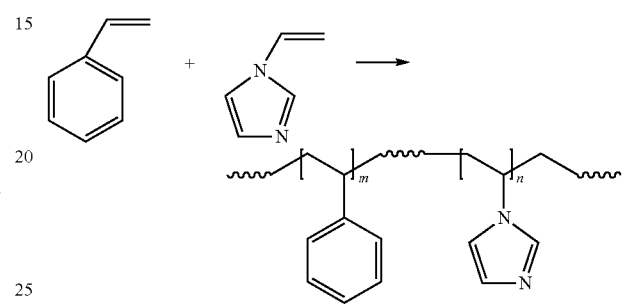

Monomers were purified as received and all reactions were controlled in a nitrogen environment. Styrene and 1-ethylenyl imidazole were mixed in a molar ratio of 70:30 and dissolved in 60 mL isopropanol (IPA) with a solid content of 40 wt %. 1 wt % AIBN was then added and reacted at 60° C. for 48 hours. The product was washed three times with 300 mL water, and then washed with 100 mL methanol. Under vacuum drying at 60° C. for 24 hours, a light yellow solid poly(styrene-1-ethylenyl imidazole) was prepared, with a yield of 87.5%.

$^1$H NMR ($d_6$-DMSO) Spectrum Data

δ=7.6, 7.1-6.8 (imidazole), 7.1, 6.8 (styrene), 3.3, 2.1, 1.5-1.0. The molar ratio of styrene to ethylenyl imidazole in the product was 71:29.

(2) Ionization of poly(styrene-ethylenylbutyl imidazole)

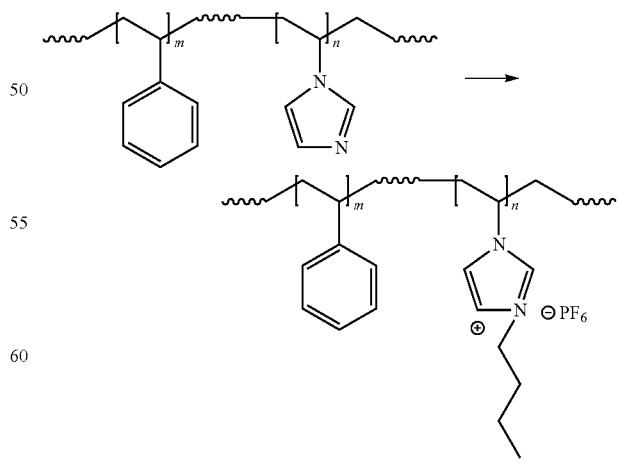

100 g poly(styrene-1-ethylenyl imidazole) was dissolved in 300 mL DMAc. Next, 300 mL 4-bromo butane was slowly added and reacted for 48 hours at room temperature. A light yellow poly(styrene-1-ethylenyl imidazole)bromide formed after removing DMAc and vacuum-dried at 60° C. for 12 hours. The Poly(styrene-1-ethylenyl imidazole)bromide was then completely dissolved in sufficient water. Next, 1.5 meq. potassium hexafluoro phosphate was dissolved in sufficient water and then slowly added to the above solution. A white powder solid precipitated after reaction for 24 hours. The solid was then washed with water three times, and then washed with methanol finally. A white solid poly(styrene-ethylenylbutyl imidazole) hexafluoro phosphate (Mw=210,000 g/mole, PDI=3.13) was prepared.

$^1$H NMR (d$_6$-DMSO) Spectrum Data

δ=8.8, 7.6 (imidazole), 7.1, 6.8 (styrene), 3.3, 2.1, 1.5-1.0. For the product, the molar ratio of styrene to ethylenyl imidazole was 72:28.

Example 2

Preparation of poly(styrene-ethylenylbutyl imidazole)hexafluoro phosphate

The preparation was similar to Example 1. Styrene and 1-ethylenyl imidazole were mixed in a molar ratio of 50:50. For the product (Mw=180,000 g/mole, PDI=3.57), the molar ratio of styrene to ethylenyl imidazole was 52:48.

$^1$H NMR (d$_6$-DMSO) Spectrum Data

δ=8.8, 7.6 (imidazole), 7.1-7.3 (styrene), 3.3, 2.1, 1.5-1.0.

Example 3

Preparation of poly(styrene-ethylenylbutyl imidazole)hexafluoro phosphate

The preparation was similar to Example 1. Styrene and 1-ethylenyl imidazole were mixed in a molar ratio of 30:70. For the product (Mw=160,000 g/mole, PDI=3.17), the molar ratio of styrene to ethylenyl imidazole was 34:66.

$^1$H NMR (d$_6$-DMSO) Spectrum Data

δ=8.8, 7.6 (imidazole), 7.1-7.3 (styrene), 3.3, 2.1, 1.5-1.0.

Example 4

Preparation of poly(styrene-ethylenylbutyl imidazole)tetrafluoro bonate (styrene:1-ethylenyl imidazole=70:30)

The preparation was similar to Example 1. Potassium hexafluoro phosphate was replaced by potassium tetrafluoro bonate. For the product (Mw=200,000 g/mole, PDI=3.22), the molar ratio of styrene to ethylenyl imidazole was 34:66.

$^1$H NMR (d$_6$-DMSO) Spectrum Data

δ=8.9, 7.5 (imidazole), 7.1-7.3 (styrene), 3.3, 2.1, 1.5-1.0.

Example 5

Preparation of poly(styrene-ethylenylbutyl imidazole)tetrafluoro bonate

The preparation was similar to Example 4. Styrene and 1-ethylenyl imidazole were mixed in a molar ratio of 50:50. For the product (Mw=170,000 g/mole, PDI=3.51), the molar ratio of styrene to ethylenyl imidazole was 34:66.

$^1$H NMR (d$_6$-DMSO) Spectrum Data

δ=8.9, 7.5 (imidazole), 7.1, 6.8 (styrene), 3.3, 2.1, 1.5-1.0.

Example 6

Preparation of poly(styrene-ethylenylbutyl imidazole)tetrafluoro bonate

The preparation was similar to Example 4. Styrene and 1-ethylenyl imidazole were mixed in a molar ratio of 30:70. For the product (Mw=163,000 g/mole, PDI=3.23), the molar ratio of styrene to ethylenyl imidazole was 34:66.

$^1$H NMR (d$_6$-DMSO) Spectrum Data

δ=8.9, 7.5 (imidazole), 7.1, 6.83 (styrene), 3.3, 2.1, 1.5-1.0.

Example 7

Preparation of poly(styrene-ethylenylbutyl pyridine)hexafluoro phosphate (1) Synthesis of poly(styrene-ethylenyl pyridine)

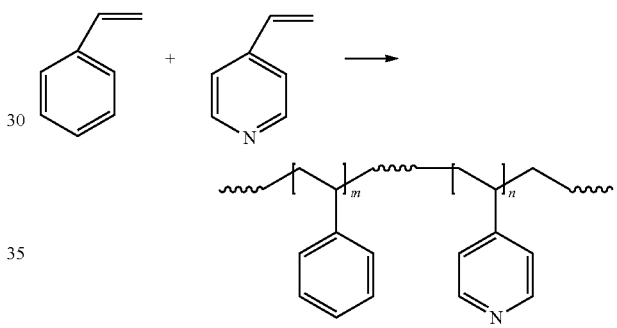

All monomers and reactants were purified by reduced pressure distillation before reaction. Styrene and ethylenyl pyridine were mixed in a molar ratio of 70:30 and dissolved in 60 mL isopropanol (IPA). 1 wt % AIBN (initiator) was then added and reacted at 60° C. for 48 hours under nitrogen environment, to form a resulting solution with a solid content of 40 wt %. The solid was washed with 300 mL water three times, and then washed with 100 mL methanol. After vacuum drying at 60° C. for 24 hours, a light yellow solid poly(styrene-ethylenyl pyridine) was prepared, with a yield of 87.5%.

$^1$H NMR (d$_6$-DMSO) Spectrum Data

δ=8.2, 7.0, 6.4, 3.3, 1.5-1.0. For the product, the molar ratio of styrene to ethylenyl pyridine was 71:29.

(2) Ionization of poly(styrene-ethylenylbutyl pyrdine

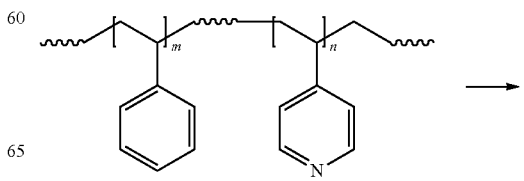

-continued

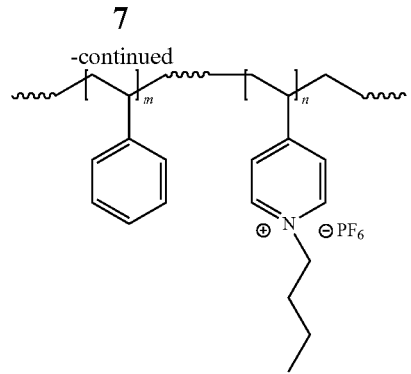

100 g poly(styrene-ethylenyl pyridine) was dissolved in 300 mL DMAc. Next, 300 mL 4-bromo butane was slowly added at room temperature and reacted for 48 hours. After removal of DMAc, the results were vacuum-dried at 60° C. for 12 hours to form a light yellow poly(styrene-1-ethylenyl pyridine)bromide; The Poly(styrene-1-ethylenyl pyridine) bromide was then completely dissolved in sufficient water. Next, 1.5 equivalent potassium hexafluoro phosphate was dissolved in sufficient water and then slowly added to above solution. Reaction at room temperature was for 24 hours. After precipitation, the white powder was washed with water three times, and then washed with methanol finally. After vacuum drying, a white solid poly(styrene-ethylenylbutyl pyridine) hexafluoro phosphate (Mw=240,000 g/mole, PDI=3.43) was prepared.

$^1$H NMR ($d_6$-DMSO) Spectrum Data

δ=8.6, 7.0 (pyridine), 7.0-6.7 (styrene), 3.3, 2.1, 1.5-1.0. In product, the molar ratio of styrene and ethylenyl pyridine was 72:28.

Example 8

Preparation of poly(styrene-ethylenylbutyl pyridine)hexafluoro phosphate

The preparation was similar to Example 7. Styrene and ethylenyl pyridine were mixed in a molar ratio of 50:50. For the product (Mw=210,000 g/mole, PDI=3.20), the molar ratio of styrene to ethylenyl pyridine was 52:48.

$^1$H NMR ($d_6$-DMSO) Spectrum Data

δ=8.5, 7.0 (pyridine), 7.0-6.7 (styrene), 3.3, 2.1, 1.5-1.0.

Example 9

Preparation of poly(styrene-ethylenylbutyl pyridine)tetrafluoro bonate(styrene:1-ethylenyl pyridine=50:50)

The preparation was similar to Example 8. Potassium hexafluoro phosphate was replaced by potassium tetrafluoro bonate. For the product (Mw=212,000 g/mole, PDI=3.31), the molar ratio of styrene to ethylenyl pyridine was 52:48.

$^1$H NMR ($d_6$-DMSO) Spectrum Data

δ=8.7, 7.0 (pyridine), 7.0-6.7 (styrene), 3.3, 2.1, 1.5-1.0.

Example 10

Preparation of poly(acrylonitrile-ethylnylbutyl pyridine) hexafluoro phosphate (acrylonitrile:ethylenyl pyridine=50:50)

The preparation was similar to Example 2. Styrene was replaced by acrylonitrile. For the product (Mw=240,000 g/mole, PDI=3.17), the molar ratio of acrylonitrile to ethylenylbutyl pyridine was 56:44.

$^1$H NMR ($d_6$-DMSO) Spectrum Data

δ=8.6, 7.0 (pyridine), 3.3, 2.1, 1.5-1.0.

Example 11

Preparation of poly(acrylonitrile-ethylenylbutyl pyridine)tetrafluoro bonate (acrylonitrile:ethylenyl pyridine=50:50)

The preparation was similar to Example 10. Potassium hexafluoro phosphate was replaced by potassium tetrafluoro bonate. For the product (Mw=236,000 g/mole, PDI=3.05), the molar ratio of polyacrylonitrile to ethylenylbutyl pyridine was 56:44.

$^1$H NMR ($d_6$-DMSO) Spectrum Data

δ=8.6, 7.0 (pyridine), 3.3, 2.1, 1.5-1.0.

Example 12

Wet spinning of ionic poly(styrene-ethylenyl imidazole) copolymer 10 g ionized poly(styrene-1-ethylenyl imidazole) and 90 g polyacrylonitrile were dissolved in 500 mL DMAc to prepare various spinning solutions with solid contents of 12-20 wt %. In the first coagulating bath, the solution contained DMAC of 60 wt % and the temperature was 30-35° C.

Figure 2:
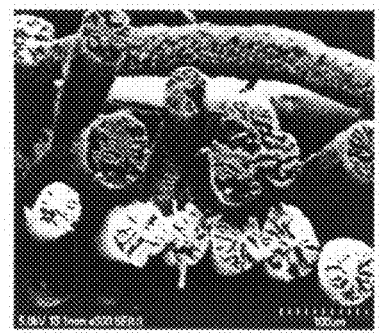
Figure 3:
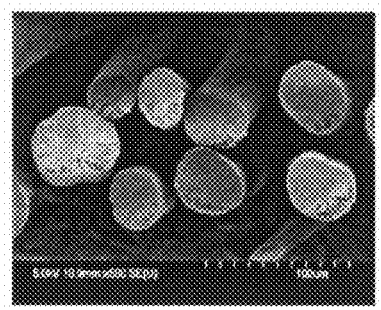

The second coagulating bath contained water only and the temperature was 70-75° C. The spinneret nozzle had a diameter of 0.12 mm. The spun fibers had diameter of 44-75 μm with 100-400 nm pores inside. The fiber surface was rough and porous. FIGS. 1-3 are SEM figures. FIG. 1 shows a cross-sectional view of wet-spun fiber from the dope solution of 12 wt % [poly(styrene-1-ethylenyl imidazole):PAN 1:9]. FIG. 2 shows a cross-sectional view of spun fiber from dope solution of 15 wt %. FIG. 3 shows a cross-sectional view of fiber from the dope solution of 20 wt %.

Example 13

Electrospinning of polyacrylonitrile (PAN)

Figure 4:
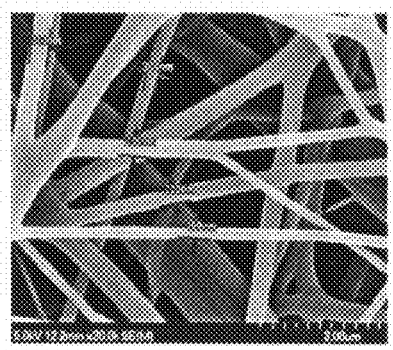
FIGS. 4-7 are SEM photographs of electrospun fiber from spinning solution of the invention.

4 g polyacrylonitrile (PAN) was dissolved in 36 g DMAc to prepare a spinning solution with a solid content of 10 wt %. The electrospinning was performed under 42.5 KV. The distance from the spinneret die to collector (DCD) was 20 cm. The morphology of the electrospun fiber was observed via SEM, as shown in FIG. 4. The diameter of the electrospun fibers ranged from 170 to 300 nm.

Example 14

Electrospinning of ionized poly(styrene-1-ethylenyl pyridine) copolymer 4 g ionic poly(styrene-1-ethylenyl pyridine) and 36 g polyacrylonitrile (PAN) were dissolved in DMAc to prepare a solution with a solid content of 10 wt % (poly(styrene-1-ethylenyl pyridine):PAN=1:9).

Figure 5:
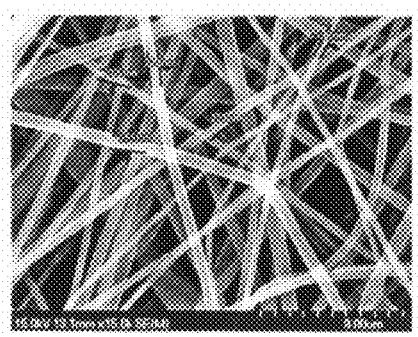

The electrospinning was performed under 42.5 KV. The CDC was 20 cm. The profile and morphology of the electrospun fibers was observed via SEM, as shown in FIG. 5. The diameter of the electrospun fibers ranged from 130 to 280 nm.

Example 15

Electrospinning of ionized poly(aniline-1-ethylenyl pyridine) copolymer

Figure 6:
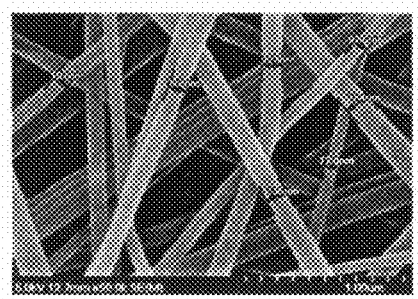

The electrospinning process and conditions was similar to Example 14. Ionized poly(aniline-1-ethylenyl pyridine) and polyacrylonitrile (PAN) were mixed in a weight ratio of 1:4, and dissolved in DMAc to prepare a solution with a solid content of 10 wt %. The morphology of the electrospun fiber was observed via SEM, as shown in FIG. 6. The diameter of the electrospun fibers ranged from 70 to 140 nm.

Example 16

Electrospinning of ionized poly(aniline-1-ethylenyl pyridine) copolymer

Figure 7:
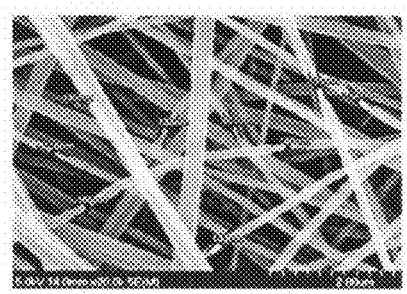

The electrospinning process and conditions was similar to Example 14. Ionized poly(aniline-1-ethylenyl pyridine) and polyacrylonitrile (PAN) were mixed in a weight ratio of 1:9 and dissolved in DMAc to prepare a solution with a solid content of 10 wt %. The morphology of the electrospum fiber was shown in FIG. 7. The diameter of the electrospun fibers ranged from 100 to 170 nm.

Example 17

Figure 8:
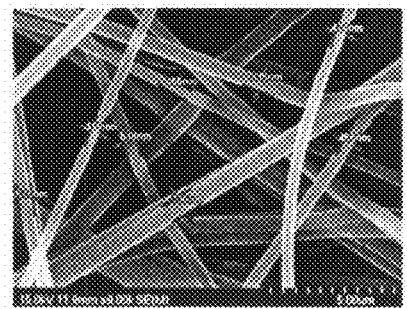
FIG. 8 is a SEM photograph of solution-blown fiber from spinning solution of the invention.

Solution blowing of ionized poly(aniline-1-ethylenyl pyridine) copolymer 4 g ionic poly(aniline-1-ethylenyl pyridine) and 36 g polyacrylonitrile (PAN) were dissolved in DMAc to prepare a solution with a solid content of 17 wt %. The solution blowing was performed under a pressure of 5 kg/cm$^2$. The result was shown in FIG. 8. The diameter of the solution blown fibers ranged from 400 to 800 nm.

Example 18

Carbon Activation of Fiber

Figure 9:
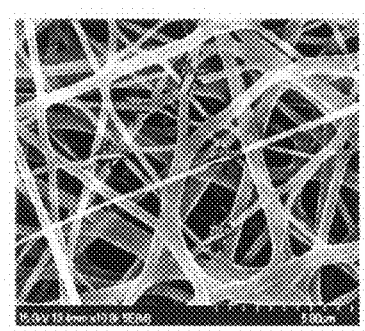
FIGS. 9-11 are SEM photographs of fibers during carbon activating process of the invention.
Figure 10:
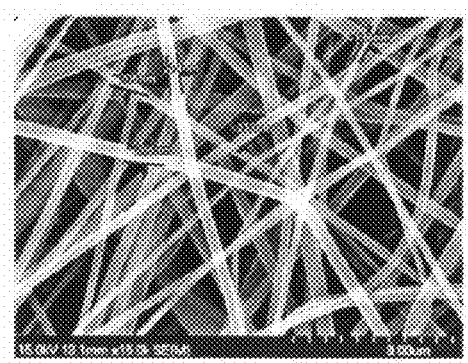
Figure 11:
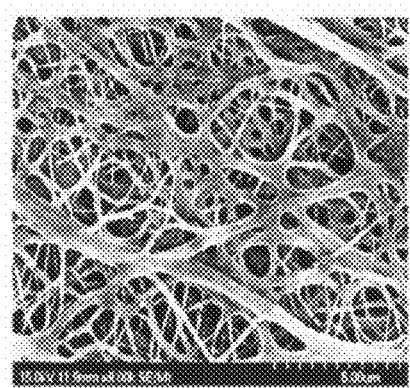

Polyacrylonitrile (PAN) fibers with diameter of 300-500 nm were thermally stabilized at 270° C. for 1 hour. The stabilized fibers were then heated to 1,000° C. (10° C./min) in a oven introducing steam-containing nitrogen, and continuously heated for 10 min to complete the carbon activation process. FIG. 9 showed the SEM photograph of the untreated fibers. FIG. 10 is the SEM photograph of the oxidized fibers. FIG. 11 is the SEM photograph of the activated carbon fibers. After stabilization, the diameter of the fibers narrowed, ranging from 100 nm to 200 nm. After carbon activation, the diameter of the activated carbon fibers are reduced to 35-130 nm. All activated carbon fibers were abundant in pores, with a specific surface area of 360-780 m$^2$/g.

Example 19

Carbon Activation of Modified Fibers

Polyacrylonitrile (PAN) fiber containing ionized poly (aniline-1-ethylenyl pyridine) with an average diameter of 200-350 nm was stabilized at 270° C. for 1 hour. Then the fibers were then heated to 1,000° C. (10° C./min) under steam-containing nitrogen introduced, and continuously heated for 10 min to complete the carbon activation process. After thermal stabilization, the diameter of the fibers narrowed, ranging from 90 to 140 nm. After carbon activation, the diameter of the activated carbon fibers achieved 35-105 nm. All activated carbon fibers were abundant in pores, with a specific surface area of 860-1,390 m$^2$/g.

Example 20

Capacitance Test

The capacitance of the activated carbon fibers was measured by the three-electrode test system comprising an Ag/AgCl electrode (reference electrode), a work electrode (activated ultra-thin carbon fiber), and a relative electrode (Pt). Activated carbon fibers produced by Examples 18 and 19 with 1 cm$^2$ were placed in a test cell. The aqueous electrolyte was 1M sulfuric acid solution. The non-aqueous (organic) electrolyte was 1M tetrahexanyl ammonium/PC solution. The cyclic voltage-current scan was performed five times utilizing a fixed voltage, with a scan rate of 6 mV/sec. The capacitance calculation formula was shown as follow. After calculating the capacitance by weight, a capacitance/unit weight was obtained.

$$C=i/v$$

C: capacitance (F); i: current (A); v: scanning rate (mV/sec)

The activated carbon fibers provide a capacitance of 450-520 F/g in aqueous electrolyte system and a capacitance of 30-35 F/g in non-aqueous (organic) electrolyte system.

While the invention has been described by way of examples and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A precursor material for an activated carbon fiber, comprising:
polyacrylonitrile (PAN); and
a polymer having formula (I):

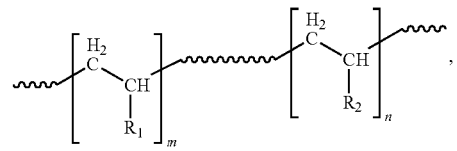

wherein
R$_1$ comprises cyano, phenyl, acetate, or methoxycarbonyl;

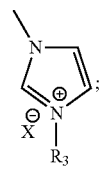

R$_2$ comprise
R$_3$ comprises C$_{1-7}$ alkyl;
X comprises tetrafluoroborate (BF$_4$), hexafluorophosphate (PF$_6$), or N(SO$_2$CH$_3$)$_2$; and
m/n is 1-99/99-1, wherein the polymer to PAN has a weight ratio less than 30%.

* * * * *